United States Patent [19]

Lovegreen

[11] 3,873,450
[45] Mar. 25, 1975

[54] SEPARATION OF LIQUIDS FROM WET SOLIDS
[75] Inventor: Alan Trevor Lovegreen, Wallingford, England
[73] Assignee: Harleyford Hydrosand Equipment Company Limited, Marlow, England
[22] Filed: Oct. 20, 1972
[21] Appl. No.: 299,382

[30] Foreign Application Priority Data
Oct. 21, 1971   United Kingdom............. 49040/71

[52] U.S. Cl.................. 210/386, 210/396, 210/400
[51] Int. Cl............................................. B01d 33/04
[58] Field of Search....... 210/66, 77, 241, 386, 393, 210/396, 401, 489, 499, 400; 100/118–120, 151–154

[56] References Cited
UNITED STATES PATENTS

| 272,324 | 2/1883 | Renwick | 210/386 X |
|---------|--------|---------|-----------|
| 3,091,335 | 5/1963 | Goard | 210/386 X |
| 3,138,088 | 6/1964 | Foth | 210/400 X |
| 3,161,522 | 12/1964 | Compton | 210/401 X |
| 3,447,451 | 6/1969 | Meskanen | 210/386 X |
| 3,459,122 | 8/1969 | Pastoors et al. | 210/386 X |
| 3,464,557 | 9/1969 | Fowler | 210/401 X |
| 3,513,974 | 5/1970 | Markwick | 210/77 X |
| 3,601,039 | 8/1971 | Schover | 210/386 X |
| 3,613,564 | 10/1971 | Adamski et al. | 210/386 X |
| 3,703,963 | 11/1972 | Eguchi et al. | 210/401 X |

FOREIGN PATENTS OR APPLICATIONS 1,160,244   8/1969   United Kingdom

Primary Examiner—Samih N. Zaharna
Assistant Examiner—Robert H. Spitzer
Attorney, Agent, or Firm—Wigman & Cohen

[57]   ABSTRACT

A water/solid mixture such as sewage or animal effluent separated on a perforate moving endless belt with the addition of a compression stage for retained material. The perforations may be transverse slits; there may be an oversize indicator and/or water disintegration step prior to pressing, and/or a scraper and/or belt cleaning air supply after pressing, together with brushes and water sprays on the belt return flight. Compression may be effected by a roller but preferably by a second belt optionally provided with individually biassed pressing rollers inside.

4 Claims, 12 Drawing Figures

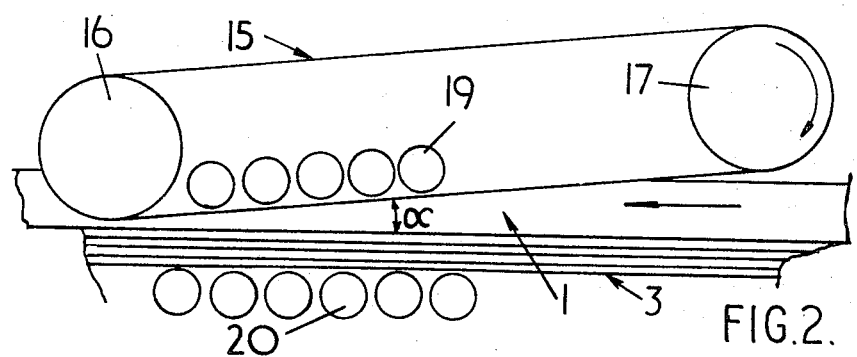
FIG. 2.
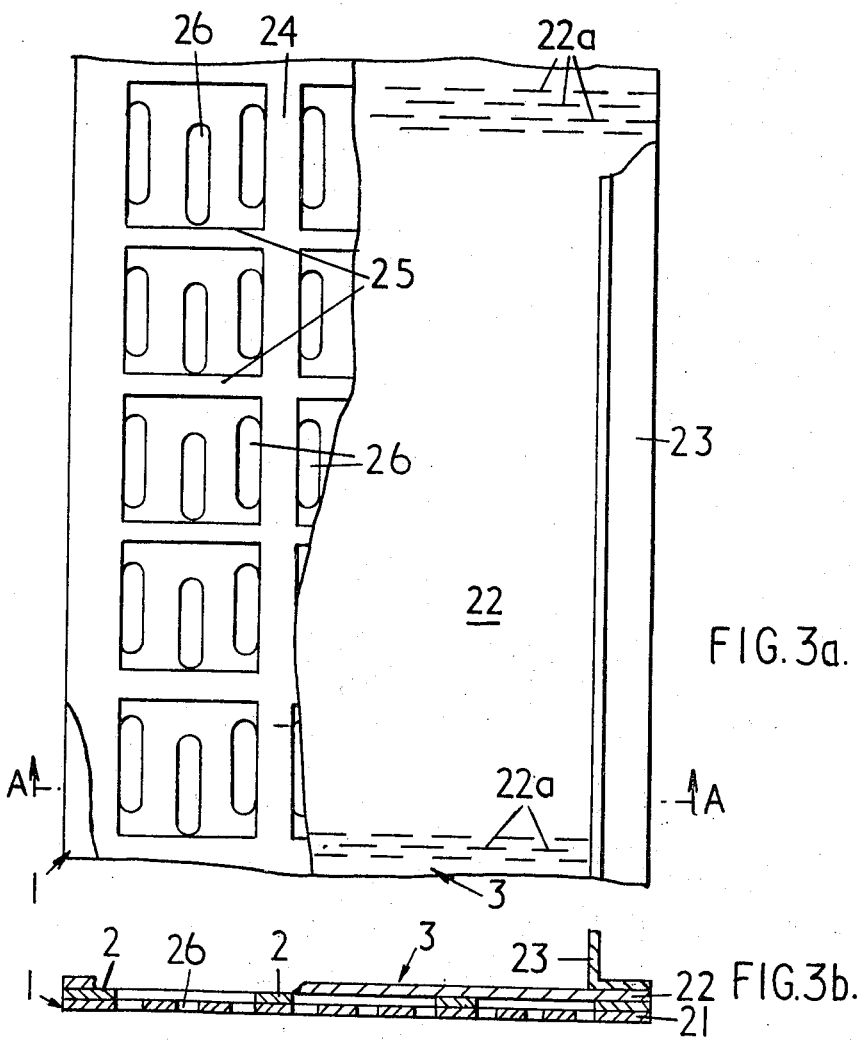
FIG. 3a.
FIG. 3b.

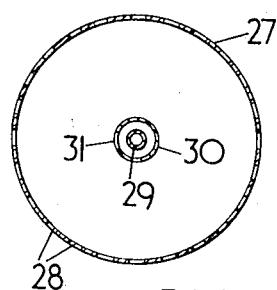
FIG.4a
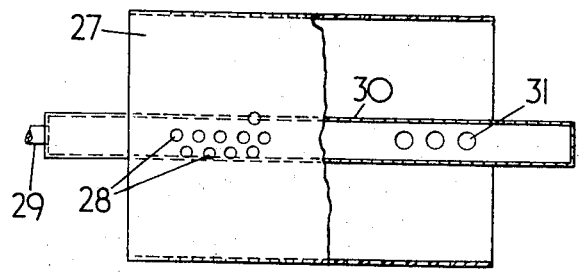
FIG.4b.
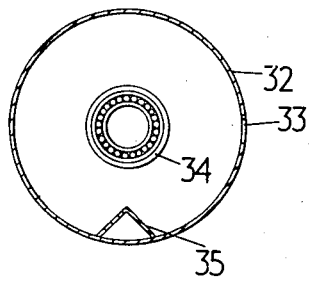
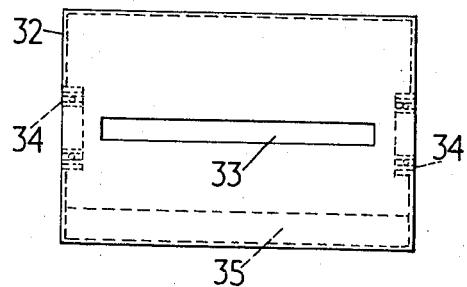
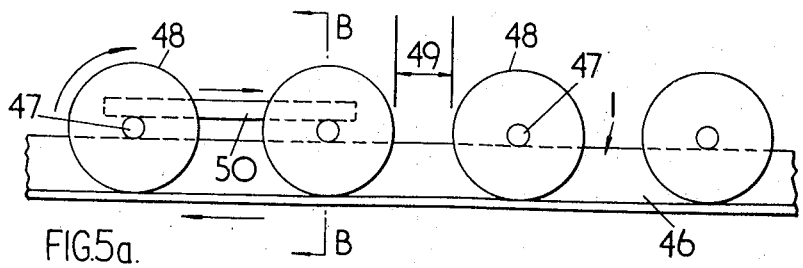
FIG.5a.
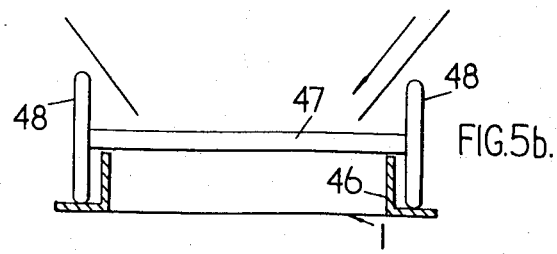
FIG.5b.

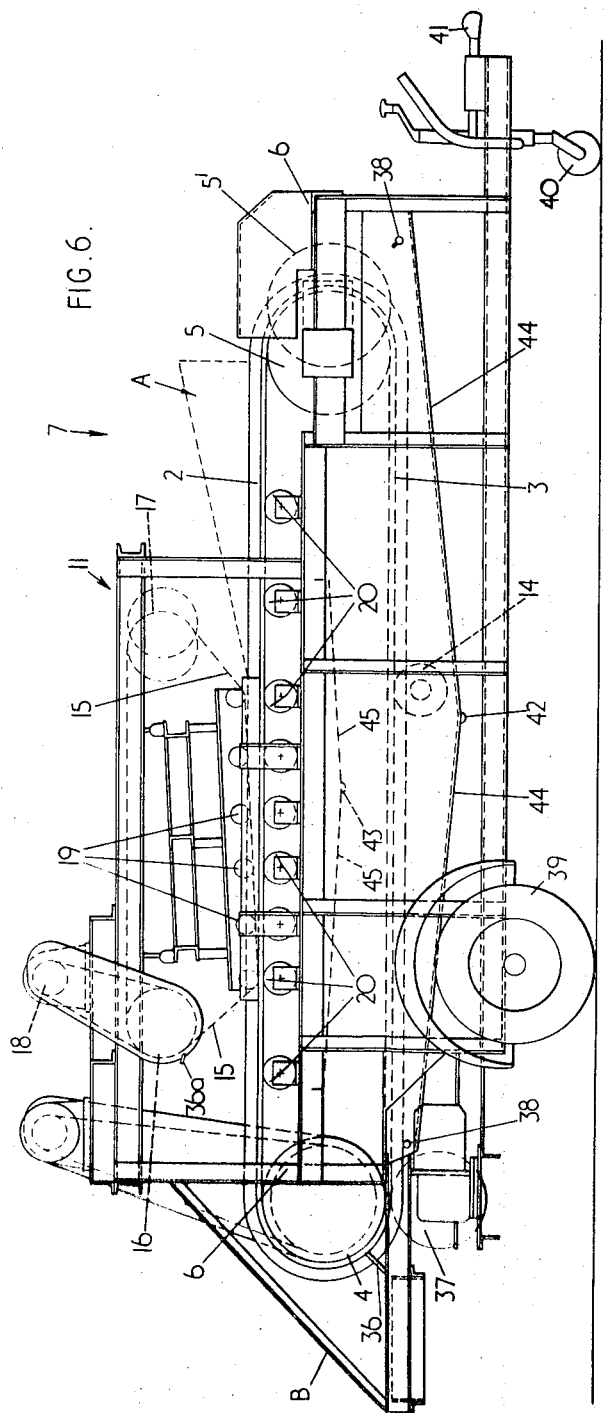

SEPARATION OF LIQUIDS FROM WET SOLIDS

This invention relates to the separation from a liquid of material suspended therein, more especially material in the form of lumps or pieces. It has special application to the treatment of sewage to remove solid matter therefrom, but can also be used in animal husbandry such as intensive pig farming, cattle farming and chicken farming to separate solids from liquids in the manure produced. Other uses are in the separation from liquid of wood pulp, paper-pulp or shredded polythene waste. Vegetable pulps generally, such as the waste from sugar-beet factories or vegetable canning factories can also be treated. For convenience the following description will be largely given in terms of treatment of sewage unless otherwise specifically stated.

It is nowadays thought undesirable to discharge raw sewage into rivers or the sea. However, with the increasing volume of sewage materials, necessarily containing a high proportion of liquid, alternative methods of disposal are extremely expensive. For example, if wet sewage screenings are burnt in an incinerator (e.g., of the type used to dispose of street rubbish etc.) either a high proportion of burnable waste or a high consumption of fuel is necessary to boil off the water content, which may be as high as 90–95 percent. Moreover, to avoid unpleasant smell even higher proportions of fuel are needed. The wet material is in no way autothermic.

The present invention sets out to overcome this disadvantage and to provide a method of separating solids from liquids, more especially in the treatment of sewage, which provides a product of low water content suitable for easy and complete incineration or for bagging and possible incorporation into a fertiliser material for use in agriculture.

The present invention can be considered in a number of aspects, including (1) a complete line of apparatus for receiving and filtering a wet material to produce a product of low water content (2) essential operative elements of such apparatus, (either alone or in combination) such as designs of dewatering or filtering conveyor belts and of equipment for removing the dewatered material from the belt and (3) a method for the treatment of raw sewage and like material suspended in or accumulated at the bottom of a body of liquid.

In an important aspect of the invention there is accordingly provided equipment for separating water from a material suspended or accumulated therein which comprises: an endless perforate dewatering belt; a head drum for driving the endless belt and located within the belt; one or more stations for loading on to said belt the material to be dewatered; and means located in the downstream direction of belt movement from the loading station for compressing the material against the perforate belt.

The loading station can be defined by guide members located over the belt. For example, sewage screenings may be deposited by conventional sweep arms as well known in a sewage plant, within such guide means.

The means for compressing the material against the dewatering belt can be a roller, made of steel and optionally faced with soft material such as rubber. Such a roller is best used when the dewatering belt is not level in transverse cross-section. In practice, however, the belt will almost always be level in such section and it is much preferred to provide an endless pressing belt over the dewatering belt and to force it against the material on the dewatering belt. This pressing belt may travel at the same speed as or at a slightly different speed from the dewatering belt. A different speed is preferable to assist self-cleaning.

Since the predominant part of the suspended material is not usually solid but contains within its structure a high proportion of water, the pressing belt further completes the function of dewatering.

The rotating compression belt may lie essentially parallel to the surface of the underlying dewatering belt, but is usually positioned at least in part at a small angle to this surface in the direction of travel. While usually it will be in the form of a smooth bolt (made for example of vulcanised rubber) it is possible to form the pressing belt so that each flight of the belt in cross-section has inwardly turned margins; the advantage of this is that when used in combination with a dewatering belt having upstanding smooth side walls the inwardly turned pressing-belt margins form an effective seal against such upstanding sides of the dewatering belt and thus increase the effective pressure which may be applied. It may be necessary to provide a separate drive for the pressing belt. The pressing belt is generally supported (e.g., on an internal surface) by plurality of backing rollers or by air-cushion pressures. Such backing rollers may be individually biassed to exert pressure from within the pressing belt. In such an instance a corresponding plurality of support rollers will usually underlie the dewatering belt surface, such rollers preferably being circumferentially grooved to improve liquid flow; again, these expedients are used to increase the effective pressure on the area in question.

It is optional to provide immediately prior to the belt water-jets which impinge upon the material on the dewatering belt to wash it free from adherent liquid and to disintegrate the solid material and thereby facilitate subsequent pressing.

While the material which has been compressed against the dewatering belt can in some instances merely be allowed to fall off as the belt rotates downwards over a drum for its return flight, it is possible to add a scraper or like removal means at this point.

It is also important in many cases to ensure adequate cleaning of the dewatering belt. One way of doing this is to provide one or more brushes, usually rotary, and/or one or more cleaning water jets, which act on the return flight of the dewatering belt. Alternatively or additionally means for blowing air outwards through the belt perforations may be provided, especially when the device is to be used for animal manure containing any quantities of fibrous material which may accumulate across the perforations.

In a specific embodiment, to which the invention is not limited, the air-blowing means consists of a perforated cylindrical head drum over which the dewatering belt passes, air inlet means to the interior of the drum, and a separate internal drum, around which the perforated drum slides, which is associated with a transverse orifice slot through which the supplied air can escape only to those perforations in the outer drum for the time being overlying the slot.

The internal drum can rotate at a small clearance with the outer drum and possess a slot in its surface or can rotate at a larger clearance and possess a suitable air duct communicating with the perforations.

It will be apparent that the supplied air escapes only through a narrow line of perforations and accordingly exerts sufficient pressure from within those perforations to blow clear any remaining adherent or trapped material.

It is convenient to journal the perforate drum on a perforate tube constituting an axle. The internal, non-rotating, drum lying within the outer drum can be journalled around the axle on ball bearings and provided with a ballast weight so that it does not rotate with the outer perforate drum. Usual and conventional air sealing means can be provided at the various joints and bearings of such a construction so that the supplied air escapes only through the elongate orifice slot and the outer drum perforations for the time being overlying this.

The nature of the perforate dewatering belt according to the invention can vary. For example a dewatering belt as described and claimed in my earlier U.S. Pat. No. 1,160,244 can be used, especially with a sorbo backed pressing belt or roller. However, it is preferred to use a dewatering belt with a flat conveyor surface, since this most readily lends itself to the compression of the conveyed material. Such a belt may be provided with a strong underlying base and an overlying perforate layer (for example containing the transverse slit-type perforations as described in my earlier patent) which is separated from the base by longitudinal spaced ribs. Perforations can be provided in the base to allow the water to escape downwards and drain away. Such a two-layer belt is suited to machines of high loading where high tensions need to be exerted on the belt, but it is possible to provide a belt having only a single perforate layer e.g., if the load is relatively small. Such a belt may also be provided with side walls to assist in retaining the material against escape transversely, especially when being compressed. This is of greater value in treating animal effluent. However, such side walls are not strictly necessary (especially for normal sewage) and in an alternative design of belt are dispensed with the necessary tensioning of the belt in such an instance being done by incorporating an underlying reinforcing strip at each belt margin, or within the belt thickness at its margin. Such reinforcement can also supplement the presence of side walls.

A type of belt construction is also envisaged which includes the overlying perforate layer and the side walls but has an underlying support base including transverse ribs spaced at such a distance as to correspond generally with the width (i.e. the smaller dimension) of the elongate orifice slot in the inner drum, so that the air supplied from this orifice and the overlying perforations can have its action effectively confined over a small belt area.

It is generally much preferred to have the belt perforated by a large number of transverse slits. Such slits will open out to a variable extent, depending on the pre-vulcanising tension exerted on the belt, and the belt is thus useful for a variety of materials. It is particularly valuable for the treatment of sewage since the inevitable presence of faecal matter would clog a conventional (e.g., cloth) filter whereas the presence of slits allows cleaning and the strength of the slit belt permits scrubbing. Some degree of slit-opening will usually be essential. Also, as such belt material passes over the head drum the slits will tend to open further and facilitate any air-blowing action provided to clean the belt.

If the drum perforations are sufficiently small that a number of them underlie a single slit there is an efficient cleaning action. Slits from say ¾ inch to 3 inches long and holes from say ⅛ inch to ½ inch diameter are generally compatible.

A further optional feature of the machine according to the invention is to provide means for preventing large objects from reaching the belt at a loading station. This can be done by a stationary large grid, but is preferably done by positioning over the belt a plurality of parallel transverse rotary shafts each mounted on two wheels which are driven by the belt so that together the shafts act as a grid but also convey large objects (e.g., planks, large drums, crates) away in the opposite direction to the belt movement.

Although the invention is described above in its major aspect of a complete dewatering plant, it will be apparent to a man skilled in the art that the combination of an underlying dewatering belt of whatever construction and an overlying compression belt or roller as described above in itself an aspect of the invention, whatever subsequent means are applied to the layer of material. Similarly, the air-blowing means itself, especially when formed as the perforate drum with an internal stationary drum having an orifice slot forms an aspect of this invention. It is also envisaged to provide an arrangement of a dewatering belt, pressing belt (or roller) and optionally a removal and air-blowing means mounted on a wheeled frame as a movable unit.

Another aspect of this invention is a method of treating material on an endless perforate dewatering belt, compressing the material against the belt to improve the degree of drainage and dewatering, and causing or allowing removal of the compressed material from the belt. Optionally this method can also include the steps (as described in one detailed form above not limiting the broad scope of the invention) of spraying the material prior to compression to wash and/or disintegrate the lumps to be compressed, and of removing the material for subsequent incineration or incorporation into a fertiliser.

Another aspect of the present invention consists in a sewage treatment plant incorporating one or more dewatering plants as described above.

The invention will be further described with reference to the accompanying drawings which are illustrative in nature only and do not limit the broad scope of the invention as set forth above. In these drawings:

FIG. 2 shows diagrammatically and on a larger scale a variant form of pressing belt which can be used in the equipment according to the invention;

FIG. 3a shows diagrammatically a form of dewatering belt according to the invention which can be used in the equipment of FIG. 1;

FIG. 3b shows a section along A—A of FIG. 3a;

FIG. 4a shows a construction of support drum for one end of the belt which leads to blowing clean of the perforations in the belt (in FIG. 4a the two parts of the drum are shown separately for clarity and ease in understanding);

FIG. 4b shows corresponding sections through the two parts of the drum shown in FIG. 4a.

FIG. 5a shows a side elevation of a device for preventing large objects from reading the belts;

FIG. 5b is a section through B—B of FIG. 6a.

FIG. 6 shows a longitudinal section through an alternative embodiment of equipment according to the invention;

Figure 1:
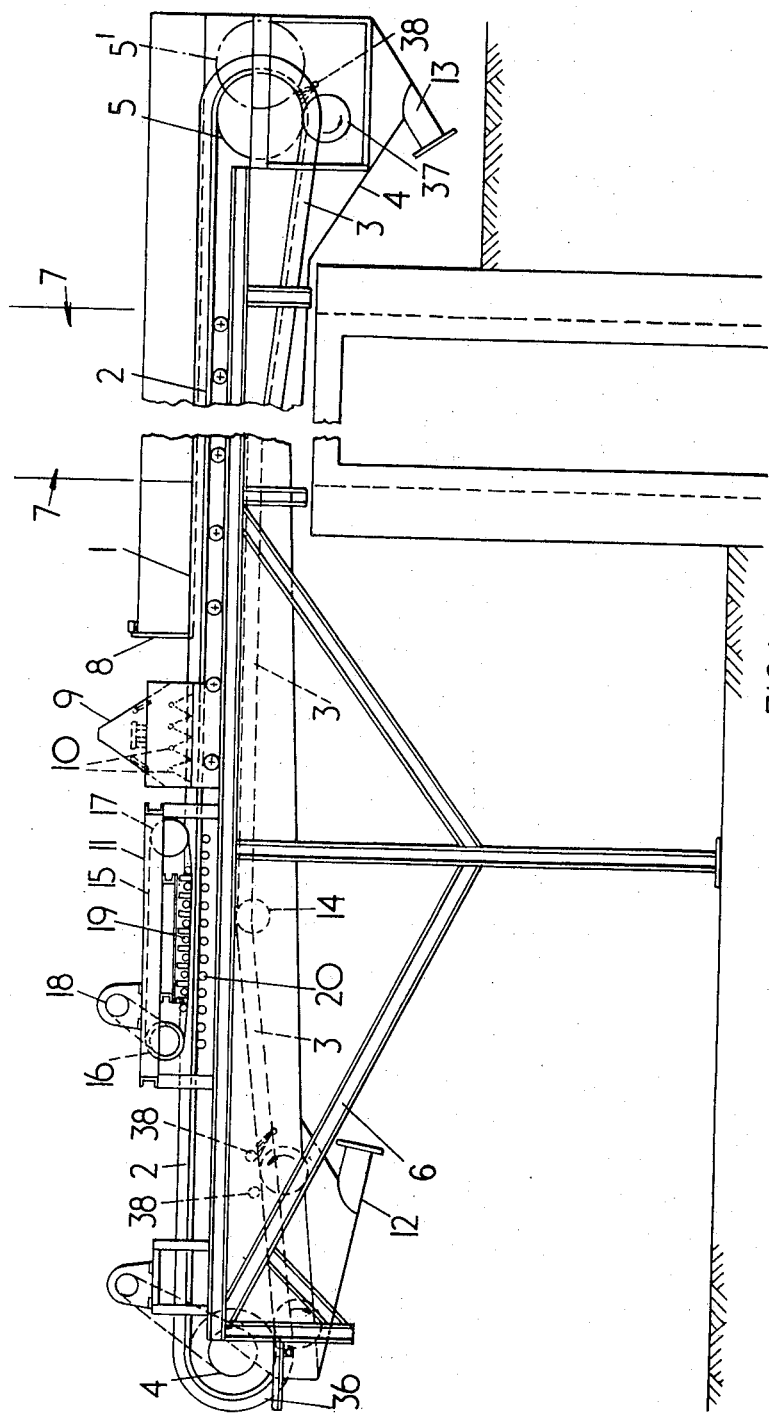
FIG. 1 shows a longitudinal section through equipment according to the invention.

The equipment shown in FIG. 1 consists essentially of a dewatering belt 1 having conveyor flight 2 and return flight 3 supported over head drum 4 and tail drum 5 which are held generally by support frame 6. Tail drum 5 is adjustable e.g., to position 5' to tension the belt as required immediately prior to use.

The machine is loaded at a number of stations indicated generally at 7. Imediately beyond these in the direction of travel there is an oversize indicator 8 connected to a limit switch (not shown) which will stop the equipment in the event of unduly large material being loaded on to the belt, or optionally reverse the movement of the belt to dump the large material. Following the oversize indicator 8 there is a hood 9 containing water sprays 10 located to impinge on the material on the belt. Immediately after this water spray arrangement is located a compression belt zone 11. Beneath the belt 1 is provided ducting and drain ports 12 and 13 whereby the water draining through the perforate belt 1 can be conveyed away. The return flight 3 of the belt is supported on idler rollers 14.

The compression stage 11 consists essentially of a short endless belt 15 supported on rollers 16 and 17 and driven by motor 18 in the same sense as the dewatering belt 1. Compression is effected by rollers 19 within the short endless belt 15 and cooperating rollers 20 underlying the dewatering belt.

FIG. 2 shows an alternative embodiment of the compression belt located at an angle a to the dewatering belt 1 so as progressively to increase the extent of compression.

FIGS. 3a and 3b show a particularly useful embodiment of dewatering belt consisting of a base portion 21, an overlying perforate portion 22, with slits 22a, for receiving the material to be dewatered, and side walls 23. The base portion 21 comprises longitudinal support ribs 24, transverse ribs 25, and relatively large perforations 26 so that the water drained through the overlying perforate portion 22 can be allowed to escape. Transverse ribs 25 divide the belt into relatively short regions, which is valuable when used in conjunction with a preferred form of head drum 4 described in more detail below.

Transverse slits 22a can be more or less opened out depending upon the belt tension. The wall 23 prevents loss of the wet material over the sides of the belt and assists in retaining such material especially during the compression stage.

Such a belt of the nature described falls within the scope of British Pat. No. 1,160,244 although the transverse ribs 25 are positioned relatively closely together.

The dewatering belt passes over the head drum 4 which is provided with air-supply means so that after the compressed and dewatered layer of material is removed from the belt, the slits 22a can be blown clean from their underside.

A typical construction for this purpose is shown in FIGS. 4a and 4b. In the upper part of each of these Figures is shown an outer drum 27 having perforations 28 over the whole of its surface except the margins. A central air inlet tube 29 supplies air to the interior of a hollow main axle 30 perforated at 31 to supply air to the interior of the drum.

The lower part of FIGS. 4a and 4b is shown separately for ease in understanding the drawings, but would in practice be located to slide within the upper part. It consists of a generally closed drum 32 which possesses one elongate slot 33 and is journalled around the axle 30 by ball bearings 34 which also constitute an air seal. Also provided within the drum 32 is a ballast weight 35.

FIGS. 5a and 5b show diagrammatically an expedient for ensuring that large articles do not reach the dewatering belt. A dewatering belt 1 with side walls 46 has parallel shafts 47 extending across it to define a grid. Each shaft 47 is supported to rotate by a pair of wheels 48 rolling on the outer margins of the belt outside the walls 46, the wheels of successive pairs being spaced a small distance 49 apart. Alternatively, the shafts may be of different lengths so that, seen in plan view the wheels overlap and the shafts are closer together.

If an object such as a piece of wood 50 falls on to the grid defined by shafts 47 it will move in a direction contrary to that of the belt movement, for subsequent dumping and disposal.

FIG. 6 shows a similar embodiment to that shown in FIG. 1, and where possible the same reference numerals have been used to show the same or equivalent features.

Generally speaking this shows a smaller piece of equipment in which the frame 6 is supported on road wheels 39 and support wheel 40, with coupling 41 so that it can be towed. The compression belt 15 is angled to the dewatering belt 1, as shown in FIG. 2. Drain ports 42 and 43 are isolated one from another by suitable drainage ducting 44 and 45 respectively so that different types of liquor (gravity-drainage and compression-dewatering on the one hand, and belt-washing liquor on the other) can be kept separate. Drum 4 has a stepped construction so that the operative surface of the drum can make contact with the belt undersurface while reinforced belt margins are accommodated in the stepped portion. Provision is also made for a bagging frame B beneath drum 4 to catch any pressed material for disposal or storage in bags.

When the system as shown in the various Figures is in use, solid water-containing material is swept onto or placed on the moving conveyor belt at the loading station or stations 7. This material then passes under any oversize indicator 8 and beneath any spray hood 9 where it is washed clean of adherent liquid and further disintegrated by the force of sprays 10. The wet material then passes into the compression stage 11 where it is compressed between the two belts 1 and 15. In FIG. 1 the water squeezed from the material at this stage joins the other water obtained by gravity drainage at the loading stages and supplied by sprays 10 and is drained away through ports 12 and 13. The material coming from the compression stages is more or less tightly packed upon the conveyor and must be removed. To facilitate this it is passed over the head roll 4 which is preferably of the construction shown in FIGS. 4a and 4b. Here it either falls off or is scraped off by scraper 36. The compression belt is similarly scraped clean by scraper 36a. In operation, the internal drum 32 shown in FIGS. 4a and 4b stays essentially stationary so that the slot 33 occupies a fixed place and the air supply through the perforation 31 can only escape through these perforations 28 which for the time being overlie slot 33. Thus the air supply to the underside of the belt is relatively concentrated, and its effect is further confined by the close spacing of transverse ribs 25 of the dewatering belt as shown in FIG. 3a. Since the transverse slit perforations are opened out as they pass over the drum, the high pressure blows out any adherent e.g., fibrous material which would otherwise progressively block the slits. The material removed from the belt can either be conveyed for incineration, or be allowed to transform into a useful fertiliser, or be digested to a harmless mass.

The moisture content of the material scraped off at blade 26 is usually 65 – 75 percent moisture or less, depending upon the degree of compression and the nature of the material being fed.

The return flight of conveyor passes over various rotary scrubbing brushes 37 and water jets 38 so that when it again reaches the loading stations it is in a clean and hygenic condition.

Various modifications may be made within the scope of the invention. For example, although the head drum 4 is shown as being provided with air at excess pressure so as to loosen the adherent material coming from the compression stage, it is conceivable that the head drum could be provided with a similar stationary internal drum but be kept under reduced air pressure acting over an opening in the stationary drum at least a quadrant in width so that a further filtering stage is effected. This could be used in place of or in combination with such a drum supplying excess air pressure as shown in FIGS. 4a and 4b.

Moreover, various additional cleaning brushes may be provided, for instance to supplement or replace compression belt scraper 36a, or to assist the action of water jets 38 beneath the feed end of the machine. Also, various embodiments of belt, tensioning means and demountable side frame links to allow replacement of a belt from the side can be provided, using structure which is known in other fields and need not be illustrated in detail. Another modification is to provide a helical scraping blade instead of the straight transverse blade 36 as shown. This has the advantage of not catching in the transverse belt slits, and thus leading to wear and inefficient cleaning of the belt.

Figure 7:
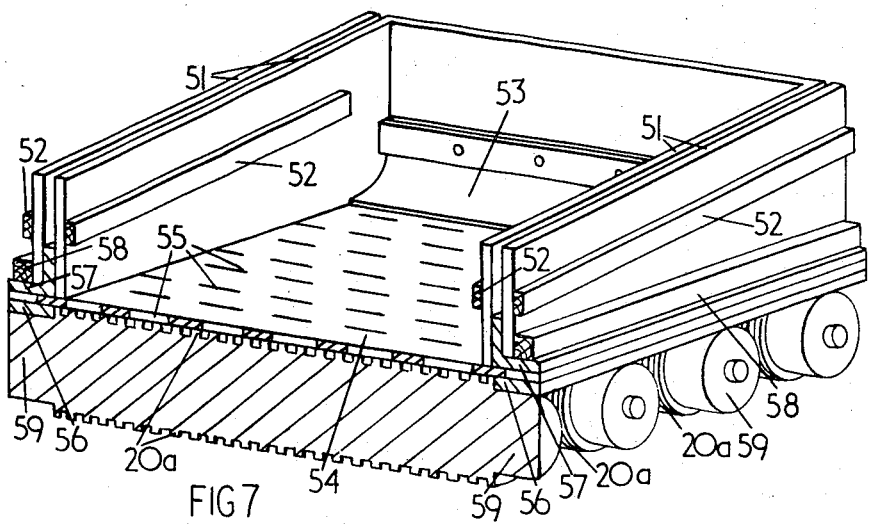
FIG. 7 shows in sectioned perspective view a loading station suitable for equipment as shown in FIG. 6.

Yet further modifications of the equipment are shown in FIG. 7, wherein a variant type of belt, a preferred loading station for animal effluent, and a grooved dewatering belt support roller are shown in combination.

When feeding a very wet material it is of advantage to have some form of feed hopper. This is conveniently done by tilting equipment as shown in FIG. 6 by some 5°– 10° so that a hopper position shown in FIG. 5 by dotted lines A arrives with its upper edge horizontal. This can be done by removing the support wheel 40 and associated structure. A construction for such a hopper, consisting of spaced side walls 51 held on the frame at rigid metal fixing bars 52 and terminated by flexible end wall 53 is shown in FIG. 7.

A suitable belt for use with this construction consists of belt surface 54 provided with short staggered transverse slits 55, longitudinal side reinforcing elements 56 and side walls 57 L-shaped in cross-section. In use the upstanding portion slides between the hopper side walls 51 in the direction of arrow C. This, aided by wooden framing 58, gives an adequate sliding seal. The belt surface 54 also forms an adequate seal as it slides beneath the flexible hopper end wall 53. Excess liquid therefore runs by gravity through the slits 55, aided by the hydrostatic pressure of the wet material held in the hopper.

The underlying rollers, in addition to possessing stepped ends at 59 to receive and drive the reinforcing elements 56 are provided with circumferential grooves 20a (e.g., of ⅛ inch square section of ¼ inch centres). This is advantageous in that a smooth roller will tend to close a transverse slit just when maximum slit-opening would otherwise be obtained, whereas the grooves still allow effective passage of liquid. (Such rollers can of course be used throughout to support the dewatering belt, and are of special value in the compression region). The rollers should be as close together as practicable, since the weight of wet material in the hopper tends to force the belt downwards between adjacent rollers and this closes the slits at these locations. Clearly, if such an embodiment as shown in FIG. 7 is used the underlying drainage ducts must be suitably shaped so that the liquid orifices are still at the lowest parts when the dewatering belt lies at 5° – 10° to the horizontal.

Figure 8A:
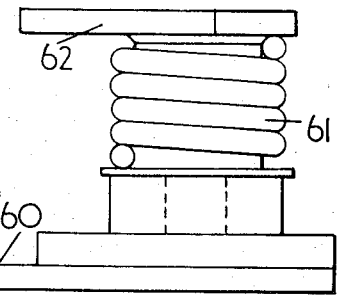
FIGS. 8a and 8b shows details of an alternative construction and mounting of the rollers within the compression belt, in plan view and side elevation respectively.
Figure 8B:
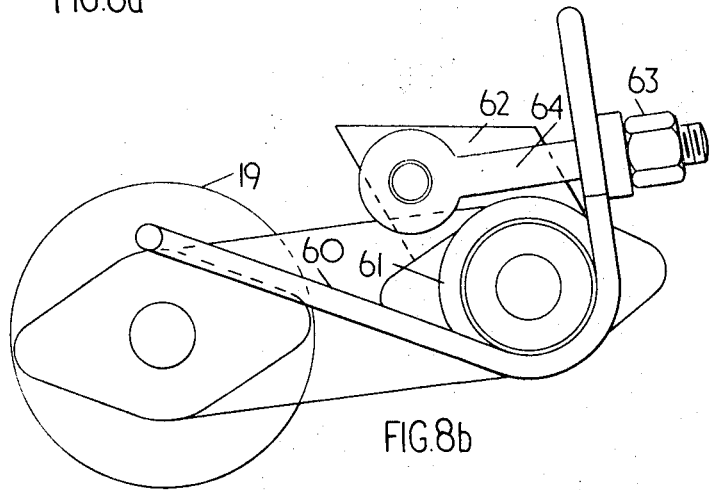

Another modification of the equipment as shown in FIGS. 1 and 6 consists in mounting each compression belt roller 19 on a separately spring biased member as shown in FIGS. 8a and 8b.

If the rollers 19 are mounted on a common mounting there is a tendency for nearly all the effective compression to take place at the first (i.e., farthest upstream) roller and the remaining compression at the last roller. The intermediate rollers can therefore be of little effect. To overcome this, each end of each roller 19 can be biased by link arm 60 attached to helical coil spring 61 which in turn is fixed on bracket 62 mounted on the subframe 11. The degree of compression on each roller 19 can be adjusted individually by adjustment nut 63 pivoted attachment bolt 64. The helical spring can be upstream or downstream of its associated roller, but it will be convenient to have the first roller with a spring located downstream and the last roller with the spring located upstream, so as not to foul the compression belt 15. The belt in a preferred embodiment is generally made of plastic or rubber such as highly abrasion-resistant rubber and usually with internal reinforcement of high-tensile or other fabric or the like. Such a belt will generally be thick enough (e.g., usually at least 4mm) that the perforations open out on tensioning the belt and/or on passing it over the head drum. Slits may open out to, for instance, a gap of ¼ to 2mm.

I claim:

1. Equipment for separating liquid from solid material suspended therein such as sewage and the like, comprising:

an endless dewatering belt formed as a single layer and having a flat receiving surface perforated with a plurality of transverse slits;

a head drum located within said dewatering belt for driving it to define an upstream and a downstream direction;

at least one station for loading onto said dewatering belt the liquid containing the suspended material;

at least one pressing stage defined by an endless pressing belt arranged to bear against said dewatering belt downstream of said at least one loading station for compressing the material disposed thereon, said pressing belt being substantially impervious to the liquid, imperforate, and smooth-surfaced;

a plurality of rollers located within said pressing belt and adapted to permit said pressing belt to run thereover;

a corresponding plurality of biassing means each connected to one of said rollers located within said pressing belt;

a plurality of support rollers located within said dewatering belt, each of said support rollers being arranged in cooperating opposed relation to a corresponding roller located within said pressing belt thereby establishing points of maximum pressure therebetween exerted on said belts by said biassing means through said rollers;

each of said support rollers being substantially the same diameter as its corresponding pressure roller and having its axis of rotation vertically aligned with the respective axis of rotation thereof; and circumferential groove means formed in said support rollers for permitting free flow of liquid through said dewatering belt onto said grooved support rollers at said points of maximum pressure.

2. Equipment as claimed in claim 1 in which at least part of the pressing belt is positioned at an angle to the dewatering belt.

3. Equipment as claimed in claim 1 wherein an underlying reinforcing strip is provided at the margins of said dewatering belt.

4. Equipment as claimed in claim 1, further comprising scraping means for removing the compressed material from the dewatering belt downstream of the at least one pressing stage.

* * * * *

UNITED STATES PATENT OFFICE
CERTIFICATE OF CORRECTION

Patent No. 3,873,450  Dated March 25, 1975

Inventor(s) Alan Trevor LOVEGREEN

It is certified that error appears in the above-identified patent and that said Letters Patent are hereby corrected as shown below:

Column 1, line 29, insert --itself-- after "material";

Column 2, line 3, "aslightly" should read --slightly--;

Column 2, line 14, "bolt" should read --belt--;

Column 3, line 19, "U.S." should read --U.K.--;

Column 3, line 38, "greater" should read --great--;

Column 4, line 21, insert --is-- before "in";

Column 5, line 6, "shows" should read --show--;

Column 7, line 17, "26" should read --36--;

Column 8, line 11, "of" second occurrence should read -- at --

Column 8, line 40, after "63" insert --on--.

Signed and Sealed this sixteenth Day of September 1975

[SEAL]

Attest:

RUTH C. MASON
*Attesting Officer*

C. MARSHALL DANN
*Commissioner of Patents and Trademarks*